TRANSFER CIRCUIT EMPLOYING MAGNETIC CORES

Filed Feb. 17, 1960 2 Sheets-Sheet 1

INVENTORS
SONIA FRANCEY
JACQUES ALBIN

BY [signature]

ATTORNEY

United States Patent Office 3,078,446
Patented Feb. 19, 1963

3,078,446

TRANSFER CIRCUIT EMPLOYING MAGNETIC CORES

Sonia Francey, Champigny-Seine, and Jacques Albin, Viroflay-Seine-et-Oise, France, assignors to International Business Machines Corporation, New York, N.Y., a corporation of New York Filed Feb. 17, 1960, Ser. No. 9,242
Claims priority, application France Feb. 27, 1959
7 Claims. (Cl. 340—174)

The present invention relates to an electromagnetic transfer circuit operating with alternating current and useable for logical purposes, for example as a counter or a shift register.

One object of this invention consists in the provision of a transfer circuit made of two series of stages arranged so that the information advances from one or more stages of one series towards one or more stages of the next higher order in the other series in response to application of an alternating current advance voltage.

Another object of this invention consists in the provision of a transfer circuit characterized in that such advance is effected when an A.C. voltage is applied first to one of the two series of stages, and then to the other series of stages.

Another object of this invention is to provide a transfer circuit comprising two bistable magnetic cores per stage, arranged to indicate two distinctly different states, referred to as OFF and ON states, according to whether the remanent flux in the two cores is in the same direction or in opposite directions.

A further object of the invention is to provide a transfer circuit of the character described wherein the state of each stage circuit is indicated in terms of the impedance presented by windings on the cores to the advance voltage.

Another object of this invention is to provide a transfer circuit wherein a predetermined impedance condition in a stage circuit causes a transfer of the information from one stage to the next.

Another object of this invention is to provide a transfer circuit of the character described which requires but one oscillation generator to make information advance between the two series of stages which comprise the circuit.

Still another object of this invention consists in the provision of a transfer circuit requiring the application of a number of oscillations to advance one step, which is advantageous in that it allows the use of magnetic cores of small dimensions, and therefore reduces the bulk of the device.

A further object of this invention consists in the provision of a transfer circuit requiring no special device for restoring or resetting the stages thereof when the A.C. advance voltage is removed therefrom, each stage being automatically reset during application of the advancing voltage.

It is also an object of this invention to provide a transfer circuit including means in each stage circuit to prevent resetting thereof in response to application of the advance voltage, thereby causing stage circuits which are ON to oscillate during the full period of application of advance voltage and to provide prolonged outputs.

An additional object of the invention is to provide a transfer or shifting circuit capable of asynchronous operation, i.e., responsive to input or control pulses applied at random intervals.

The foregoing and other objects, features and advantages of the invention will be apparent from the following more particular description of preferred embodiments of the invention, as illustrated in the accompanying drawings.

Figure 2:
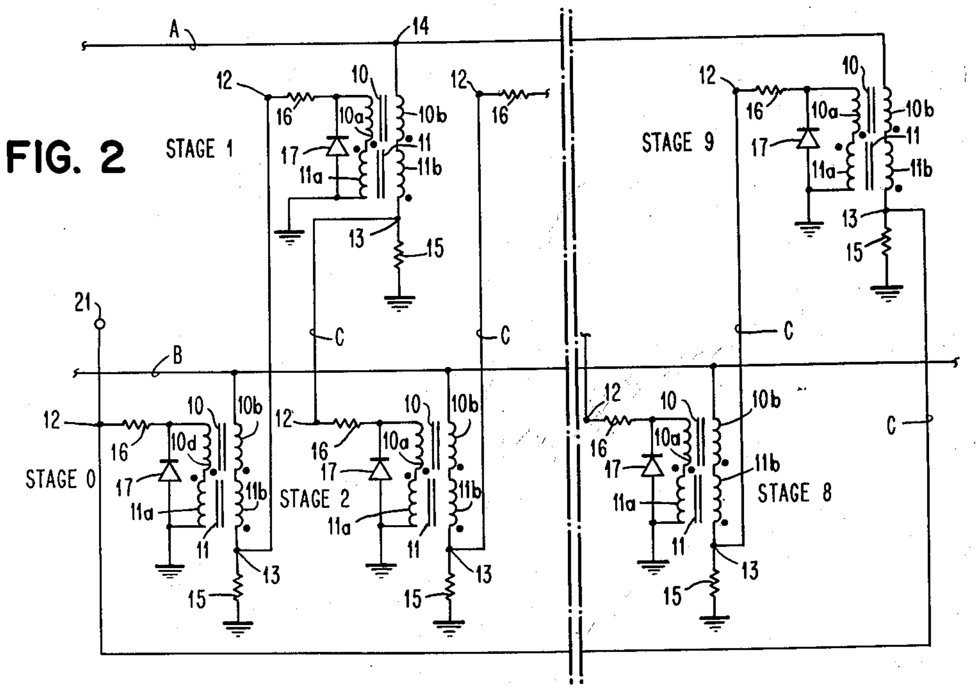
FIGURE 2 is a circuit diagram illustrating a transfer circuit employing a plurality of stage circuits provided in accordance with one embodiments of the invention.
Figures 3, 5A:
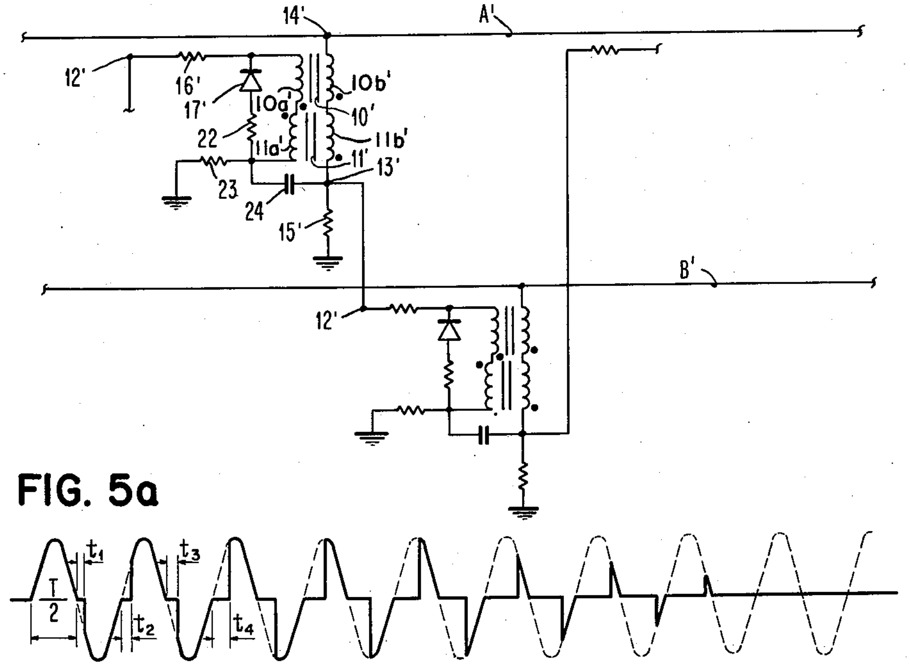
FIGURE 3 is a circuit diagram illustrating a transfer circuit employing stage circuits provided in accordance with a second embodiment of the invention.
Figure 5B:
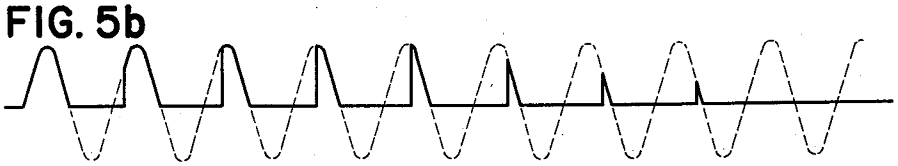
Figure 6A:
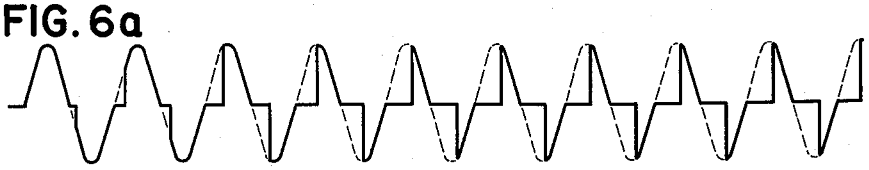
Figure 6B:
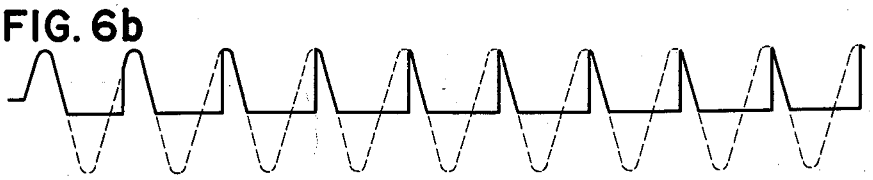

FIGURE 5*a* illustrates the output signal of one of the stage circuits of FIGURE 2 when it is ON and advancing voltage is applied;

FIGURE 5*b* illustrates the control signal applied to one of the stage circuits of FIGURE 2 in response to an output from the previous stage;

FIGURE 6*a* illustrates the output signal of one of the stage circuits of FIGURE 3 when it is ON and advancing voltage is applied; and FIGURE 6*b* illustrates the control signal applied to one of the stage circuits of FIGURE 2 in response to an output from the previous stage.

Figure 1:
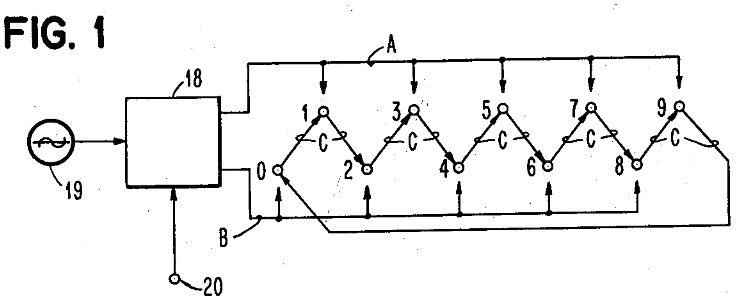
FIGURE 1 represents a block diagram of a transfer circuit embodying the present invention.

Referring now in detail to the drawings, there is shown in FIGURE 1 a block diagram of a transfer or shifting circuit provided in accordance with this invention. The circuit comprises ten stages or registers, identified by the numbers 0, 1, 2, 3, 4, 5, 6, 7, 8 and 9, and represented as small circles. These several stages are divided into two series, an odd series including stages 1, 3, 5, etc. and an even series including stages 0, 2, 4, etc. The stages are connected in cascade, the output of stage 0 providing an input to stage 1, the output of stage 1 providing an input to stage 2, and so on. The output of the final stage 9 may be connected to the input of stage 0, as shown, to provide a closed ring or it may be connected to some suitable utilization device, depending upon the purpose to which the transfer circuit is put.

Advancing voltage for the shifting circuit is supplied from a single A.C. voltage source 19. The source 19 may generate voltage of sinusoidal or rectangular waveform in any of a relatively wide range of frequencies, depending upon the characteristics and parameters of the components employed in the stage circuits to be described. For the purposes of the following description it will be assumed that the source 19 produces generally sinusoidal voltage of a frequency of, for example, about 10 kilocycles.

Figure 4:
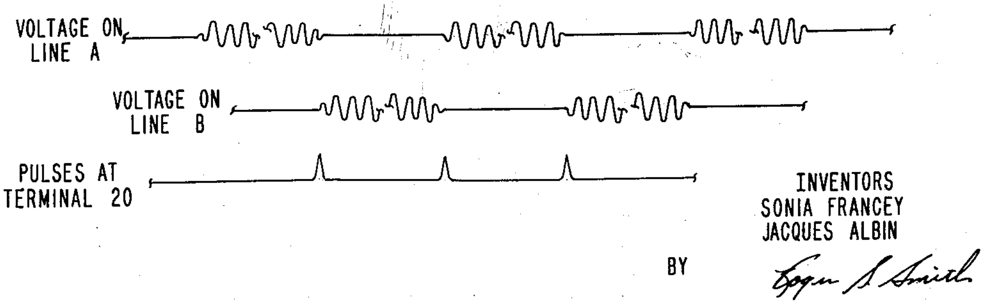
FIGURE 4 is a diagram illustrating the manner of application of A.C. advance voltage to the two series of stage circuits shown in FIGURE 1.

The source 19 is connected through a switching device 18 to two advance lines A and B. Line A feeds advance voltage to all of the odd numbered stages and line B feeds advance voltage to all of the even numbered stages. The switching device 18 operates in response to control pulses applied to a control terminal 20 to switch the source 19 from one to the other of lines A and B. The device 18 may be any suitable electronic switch, trigger, etc. capable of performing this function. FIGURE 4 illustrates the manner in which the output of source 19 is applied alternately to lines A and B under control of pulses applied at terminal 20.

The advancing voltage supplied through lines A and B causes information stored in the stage circuits to be transferred or advanced through the circuit. When the advance voltage is applied, for example, to line A, it causes a transfer of information from the odd stages to the next higher even stages. When applied to line B it causes a transfer from the even stages to the next higher odd stages.

Since all of the stage circuits are identical, only one will be described in detail. Referring now to FIGURE 2, it will be seen that each stage circuit includes two substantially identical magnetic cores 10 and 11. The cores 10 and 11 are fabricated from material exhibiting a generally rectangular hysteresis cycle. The core 10 has two separate windings inductively coupled thereto, a control winding **10*a* and an advance winding 10*b*. Similar control and advance windings 11*a* and 11*b* are provided for core 11. The control windings 10*a* and 11*a* are connected in series, the connections being made so that the polarity of winding 10*a* is opposite to that of winding 11*a*. Through a resistor 16, the upper end of the series combination of windings 10*a* and 11*a* is connected to an input terminal 12. The lower end of the series combination is connected to ground, as shown by the conventional symbol. A diode 17 is connected in shunt across the windings 10*a* and 11*a***.

The two advance windings **10*b* and 11*b* are also connected in series. These windings are connected in series aiding, however, as indicated by the polarity dots in FIGURE 2. The upper end of this series combination of windings is connected by a terminal 14 to one of the advance lines A and B. As previously indicated, the terminal 14 of each odd numbered stage is connected to line A while the terminal 14 of each even numbered stage is connected to line B. The lower end of the series combination of windings 10*b* and 11*b* of each stage is connected through a resistor 15 to ground. An output terminal 13 is provided between the resistor 15 and the winding 11*b***.

The connection from the output of one stage to the input of the next is provided by a line C coupling the output terminal 13 of each stage with the input terminal 12 of the stage having the next higher number. If it is desired that the transfer circuit be a closed ring in which information may be circulated indefinitely, the terminal 13 of stage 9 may be connected back to the terminal 12 of stage 0.

The operation of one stage, and the transfer of the information from stage 1 to stage 2 will now be described, the other stages obviously operating in the same way. Each stage may assume two stable states, which are called OFF and ON conditions. In the OFF condition, the remanent magnetization of the two cores is in the same direction, whereas in the ON condition, the magnetizations are opposite. Information is shifted from one stage to the next by transferring the remanent magnetization condition from one group of two cores to the next.

(1) Let it be assumed that the subject stage is in the OFF condition, that is, the cores are in equal magnetic states, no control signal having been applied to input terminal 12 from the preceding stage. Under the action of an A.C. advance voltage applied to terminal 14, on a diagram representing the induction variation according to the magnetic field, the points representing the induction of the two cores vary equally so as to traverse completely a hysteresis loop. Both cores operate as transformers, the advance windings **10*b* and 11*b* operating as primary windings and the control windings 10*a* and 11*a* operating as secondary windings. Since the cores are being identically driven, the voltages induced in windings 10*a* and 11*a* are equal. Since these windings oppose each other, no current flows therethrough and the resistance applied to the advance windings 10*b* and 11*b* is infinite. Due to this high impedance condition practically no current flows through advance windings 10*b* and 11*b* and through resistor 15, therefore no output signal occurs at terminal 13**, and the input terminal of the following stage is not energized.

(2) Let it be assumed that the stage 1 is On. During a preceding step, the voltage from the output terminal 13 of the preceding stage 0 has been applied to terminal 12. Through resistor 16, this signal, which is an A.C. voltage as will appear more clearly later herein, is applied in parallel to diode 17 and to the two control windings **10*a* and 11*a* of cores 10 and 11. During the negative alternances of this input signal, diode 17 shows a negligible impedance with respect to that of the control windings 10*a* and 11*a*, and acts as a short circuit to ground. On the contrary, for the positive alternances, the diode 17 shows a high impedance and consequently, the positive alternances of the input signal are applied to the control windings 10*a* and 11*a* of cores 10 and 11, the winding directions of which are such that core 10 is positively saturated and core 11 is negatively saturated. This condition of opposite remanent magnetism in cores 10 and 11 represents the ON state. When, under the action of a pulse to applied terminal 20, switch 18 is toggled to connect source 19 with line A advance voltage is applied to terminal 14 of the now ON stage 1. Let it be assumed that T is the period of the A.C. advance voltage. The first positive alternance of this advance voltage, operating through windings 10*b* and 11*b*, generates in both cores 10 and 11 a magnetic flux which, in core 10, is in phase with that which has been generated by the input signal, and in core 11 in opposition. Core 10**, therefore, will be maintained at positive saturation during the whole positive alternance of the first oscillation, i.e. the period $$\frac{T}{2}$$

whereas core 11 is subjected to a flux variation; it starts traversing its hysteresis loop toward positive saturation and operates as a transformer. The voltage induced in control winding **11*a* by this transformer action is positive at the undotted end of control winding 11*a*, forward biasing diode 17. Diode 17 and the winding 10*a* of positively saturated core 10 provide a very low impedance for winding 11*a*, causing core 11** to operate as a nearly short crcuited transformer during the whole period $$\frac{T}{2}$$

While core 11 is operating in this manner, the advance winding **11*b* also presents a low impedance, and substantially all of the advance voltage appears across resistor 15. Because of the nearly short circuited condition, core 11** will traverse its hysteresis loop at a very slow rate, and one a small amount of flux will be switched during the time $$\frac{T}{2}$$

The graph of FIGURE 5*a* represents the output voltage of stage 1 during operation now being described. The solid line represents the voltage across resistor 15, while the dotted line represents the advance voltage applied to terminal 14. As may be seen, the voltage across resistor 15 during the positive alternance of the first cycle is substantially equal to the advance voltage.

At the end of the positive alternance of the first cycle of the advance voltage, core 10 is positively saturated, and core 11 is in a state somewhat short of negative saturation. Upon commencement of the negative alternance of the first cycle both cores are driven toward negative saturation. For a short period $t_1$ until core 11 is brought back to negative saturation both cores traverse their hysteresis loops and operate as transformers with opposed secondaries. During period $t_1$ no current flows in the control winding circuit and a very high impedance is presented by the advance windings **10*b* and 11*b*. Practically all of the advance voltage appears across windings 10*b* and 11*b* and almost none appears across resistor 15**, as indicated in FIGURE 5*a*. When core 11 reaches negative saturation, the induced voltage in winding **11*a* drops off and the voltage in winding 10*a*, positive at the dotted end, is unopposed. Core 10 now operates as a nearly shorted transformer for the remainder of the negative alternance of the first cycle. The impedance of its advance winding 10*b*, like the impedance of winding 11*b* of negatively saturated core 11**, becomes very low, allowing substantially the full advance voltage to appear across resistor 15 for a time equal to $$\frac{T}{2}-t_1$$

At the end of the first full cycle of the advance voltage, core 11 is at negative saturation and core 10 is at a point short of positive saturation. It will be noted that this condition is similar to the initial ON condition, except that core 10 is less than saturated in the positive direction. This core has been permitted to traverse its loop toward negative saturation while core 11 was regaining negative saturation during period $t_1$ and has continued to traverse its loop an additional incremental amount while operating as a nearly shorted transformer.

During the second and following cycle of the advance voltage, the sequence of events described with reference to the first cycle will be repeated. Inasmuch as the cores 10 and 11 traverse alternately their loops incremental amounts during operation as short circuited transformers, the periods $t_2$, $t_3$, $t_4$, etc. during which both are operating as opposed transformers become successively longer. The periods $$\left(\frac{T}{2}-t_2\right), \left(\frac{T}{2}-t_3\right)$$

etc., during which voltage is applied to resistor 15 become successively shorter. Eventually the unbalanced condition of the cores 10 and 11 is erased, and the cores are brought to equal magnetic states. At this time, the stage is again in the OFF condition and, as previously explained, no voltage appears across resistor 15. The number of cycles of the advance voltage required to return the stage to its OFF state depends upon the characteristics of the cores 10 and 11, the impedance of the control winding circuit during operation of the cores as shorted transformers, and the magnitude of the advance voltage. By proper adjustment of these variables, the persistence of the ON condition may be varied as desired over a wide range.

It will be noted from the foregoing description that the OFF state of a stage circuit is indicated by a constantly high impedance of its advance windings 10*b* and 11*b* and practically no voltage drop across its resistor 15. An ON state is indicated by periods of low impedance of the advance windings and high voltage drops across the resistor 15. Under these circumstances the voltage appearing across resistor 15 from terminal 13 to ground may be taken as an output signal representing the ON condition of the stage under consideration. With the circuitry shown, line C transmits this voltage to the input terminal 12 of the following stage 2 where it is applied to the parallel combination of diode 17 and control windings 10*a* and 11*a*. The diode 17, poled as indicated in FIGURE 2 presents a very low impedance to the negative alternances of the applied voltage and shorts the windings 10*a* and 11*a*. The resistance of diode 17 to the positive alternances is high, however, and they are applied to the winds 10*a* and 11*a*. The graph of FIGURE 5*b* illustrates the waveform of the input voltage as applied to these windings. It appears as a half wave rectification of the output waveform shown in FIGURE 5*a*. As described earlier, positive voltage applied at terminal 12 drives the core 10 to positive saturation and drives the core 11 to negative saturation. The input voltage shown in FIGURE 5*b* thus conditions cores 11 and 12 of stage 2 to the ON state. Since the output of stage 1 persists during several cycles of the advance voltage, the cores 10 and 11 of stage 2 are assured of being driven well into saturation in their respective states, even if the input signal or the number of turns of the windings 10*a* and 11*a* is not sufficient to accomplish this in a single cycle.

It should be apparent from the description thus far that information stored as an ON state in stage 1 has been erased therefrom and transferred to stage 2 by application of alternating advance voltage to line A. When switch 18 is reversed upon application of another pulse to terminal 20, and voltage is applied to line B, the information will be transferred from stage 2 to stage 3. Each pulse applied to terminal 20 thus advances the information one step through the shifting circuit. Since an ON or an OFF state will exist indefinitely when the stages are in a quiescent state, the pulses applied to line 20 may be received at random and need not be uniformly spaced.

The circuit just described is well adapted for several purposes, for example, decimal counting. A decimal counter comprises ten stages for each order; units, tens, hundreds, etc. A circuit connected as shown in FIGURE 1 may be employed for each order. The terminal 20 of the low order counter would receive pulses to be counted. The output of stage 9 of each order activated only upon the tenth information shift, would be employed to provide pulses to the terminal 20 of the next higher order, thereby transferring a carry.

It is obvious that this counter may as well be conceived so as to count according to other notations, for example, the biquinary notation.

To have this device operate as a shift register, the information to be recorded, transferred or displayed may be applied as positive signals to an input terminal 21 of stage 0 (see FIGURE 2). A positive voltage applied to terminal 21 switches stage 0 ON, i.e. sets an unbalance between the remanent magnetism of the two cores of stage 0. It is obvious that when no input signal is applied stage 0 keeps OFF. Pulses synchronized with information pulses at terminal 21 are applied to terminal 20 (FIGURE 1), so that device 18 switches the advance voltage alternately from line A to line B and conversely, so as to make the information advance along the registers. The applications of such a shift register are numerous; for example it permits conversion to the parallel form of information serially applied. It may also be used as a delay device allowing use of information applied to stage 0 after a predetermined delay. In the case where the last stage of the shift register is connected to the input terminal of the first stage 1 it makes a ring wherein the information flows endlessly.

FIGURE 3 represents two stages of a modified embodiment of a transfer circuit provided in accordance with the invention. This modification consists of inserting two additional resistances 22 and 23 and a condenser 24 to each stage. Condenser 24 connects output terminal 13′ to one end of the control winding 11*a*′ of magnetic core 11′. The main function of this condenser is to re-apply to the control windings 10*a*′ and 11*a*′ part of the voltage appearing on output terminal 13′. If the stage is OFF, there is no voltage on terminal 13′, and the condenser will have no effect. On the contrary, if the stage is in the ON condition, the feedback introduced by the condenser maintains the unbalance condition between the remanent magnetism of the two magnet cores 10′ and 11′, thereby maintaining the stage ON so long as the advance voltage is applied to the stage.

The condenser 24 is charged during operation of each core 10′ and 11′ as a short circuited transformer, and then discharges through windings 10*a*′ and 11*a*′ to regenerate the unbalance condition as each alternance of the advance voltage falls to zero. The resistances 22 and 23 discourage discharge through paths which do not include the windings 10*a*′ and 11*a*′.

The output signal at terminal 13′ is then such as represented in the curve of FIGURE 6*a*, which is different from the corresponding curve of FIGURE 5*a*, because the output signal is maintained at a substantial level and does not decay. The inclusion of this condenser is advantageous in that by preventing the stage from resetting, it conditions the stage to provide a constant output signal on terminal 13 for as long as advance voltage is applied. A signal of this sort may be used in many ways: for example, it may be used to fire gas discharge tubes to indicate the register stages which are ON, or else to display the result from the counter. The oscillations that this condenser emits increase the device stability, since the ON condition of the stage may be maintained indefinitely. When, under the action of a new pulse to be counted the advance voltage is switched, the stage stops oscillating and the following stage commences, it having been turned ON by the constant output of the previously oscillating stage. This constant output applied at terminal 12' of said next stage is rectified by diode 17' and the voltage across the control windings 10a' and 11a' is in the shape indicated in FIGURE 6b. Since the output is constant so long as advance voltage is applied to an ON stage, it may be applied to the next stage long enough to insure that the unbalanced condition between the remanent magnetism of the two cores has been transferred, thus increasing the operation accuracy of the shifts.

It is obvious that the circuits of FIGURES 2 and 3 are but illustrative embodiments, and any substitutions, suppressions, or adjunctions, and particularly, any modifications affecting, for example, the advance voltage, the way of switching it, the means used for the feedback, or to rectify the control signal would be within the scope of the invention.

In the foregoing description, the OFF state of a stage circuit has been defined as the state wherein the remanent states of the two cores 10 and 11 are identical. It will be understood by those skilled in the art that the remanent state of a core, i.e. the direction of remanent flux, is important only in relation to the sense or polarity of the windings. Therefore, it is possible, by reversing both windings on one of the cores 10 or 11, to obtain a circuit operating in the same manner as the circuits hereinbefore described, but having an OFF state represented by remanent flux in opposite directions in the two cores. In such a circuit the control windings 10a and 11a will be connected in series aiding and the advance windings 10b and 11b will be connected in series opposing. A circuit so constructed will operate in the same manner as the circuits hereinbefore described and is within the scope and spirit of the invention. Regardless of the change the two cores 10 and 11 have one set of conditions wherein advance voltage induces opposing voltages in the control windings (the OFF state) and another set of conditions where advance voltage induces an unopposed voltage in only one control winding (the ON state).

While the invention has been particularly shown and described with reference to preferred embodiments thereof, it will be understood by those skilled in the art that various changes in form and details may be made therein without departing from the spirit and scope of the invention.

What is claimed is:

1. A two state circuit comprising two bistable magnetic cores each having a first and second winding coupled thereto, means connecting said first windings in series, a unidirectional conducting device connected across the series combination of said first windings, means for connecting said second windings to a source of alternating exciting voltage to coincidently excite said cores, said second windings being poled to induce opposing voltages in said first windings during each alternance of the exciting voltage when the magnetic states of said cores have one predetermined relation, thereby causing said second windings to present a high impedance, and to induce a voltage in only one of said first windings of polarity to pass current through said unidirectional device during each alternance of said exciting voltage when the magnetic states of said cores have a second predetermined relation, thereby causing said second windings to present a low impedance, and means responsive to the low impedance condition of said second windings to produce an output.

2. A two state circuit comprising two elements of magnetic material having high remanence, each said element having a first and a second winding inductively coupled thereto, means connecting said first windings in series, a unidirectional conducting device connected across the series combination of said first windings, means connecting said second windings in series, an impedance element connected in series with said second windings, means for applying an alternating advance voltage across the series combination of said second windings and said impedance element to excite said elements, the relative polarities of said first and second windings being such that when the magnetic states of said elements have a first predetermined relation each alternance of said advance voltage causes magnetic variations in both said cores and induces opposing voltages in said first windings, thereby causing said second windings to exhibit impedance high with respect to said impedance element, the relative polarities of said first and second windings also being such that when the magnetic states of said elements have a second predetermined relation at least a part of each of a predetermined number of alternances of said advance voltage causes magnetic variation in only one of said elements and induces an unopposed voltage in one of said first windings of polarity to pass current through said unidirectional conducting device, thereby causing said second windings to exhibit impedance low with respect to said impedance element, and output means connected across said impedance element.

3. The invention defined in claim 2 including input means connnected with said first windings and operable when activated to excite said first windings to condition said elements in states having the second named predetermined relation.

4. The invention defined in claim 2 wherein the first windings are connected in series opposing, the second windings are connected in series aiding, and wherein magnetic states of said elements are substantially identical according to the first predetermined relation and substantially opposite according to the second predetermined relation.

5. A shifting circuit comprising at least two binary stage circuits each of which includes a pair of bistable magnetic cores, each said magnetic core having a first and a second winding inductively coupled thereto, the first windings of said pair of cores being connected in series, the second windings of said pair of cores being connected in series, the windings of one of said series combinations being connected in opposing relation and the windings of the other of said series combinations being connected in aiding relation, a unidirectional conducting device connected across the series combination of said first windings, and an impedance element connected in series with said series combination of said second windings, circuit means connected between the impedance element of one of said two stage circuits and the series combination of first windings of the other of said two stage circuits for impressing across said first windings of the said other of said two stage circuits a voltage proportional to that appearing across the impedance element of the said one of said two stage circuits to transfer information from said one of said two stage circuits to the other of said two stage circuits, a source of alternating current advance voltage, and means for alternately applying said advance voltage across the series combination of second windings and impedance element in said one of said two stage circuits and the series combination of second windings and impedance element in said other of said two stage circuits.

6. A shifting circuit comprising a plurality of binary stage circuits each of which includes a pair of bistable magnetic cores, each said magnetic core having a first and a second winding inductively coupled thereto, the first windings of said pair of cores being connected in series, the second windings of said pair of cores being connected in series, the windings of one of said series combinations being connected in opposing relation and the windings of the other of said series combinations being connected in aiding relation, a unidirectional conducting device connected across the series combination of said first windings, and an impedance element connected in series with said series combination of said second windings, said stage circuits being functionally arranged in series, circuit means connected between the impedance element of each stage circuit and the first windings of the following stage circuit for impressing across the first windings of said following stage circuit a voltage proportional to that appearing across the impedance element of said each stage circuit to transfer information from stage to stage, an alternating current advance voltage source, first and second advance voltage supply lines, said first supply line connected to the series combination of second windings and impedance element of alternate ones of the stage circuits the second supply line connected to the series combination of second windings and impedance element of the remaining ones of the stage circuits, and switch means for switching said advance voltage source between said first and second supply lines.

7. A two state circuit comprising a pair of magnetic cores exhibiting generally rectangular hysteresis loop characteristics, first and second windings inductively coupled to each of said cores, said first windings being connected in series, a unidirectional conducting device connected across the series combination of said first windings, said second windings being connected in series, an impedance element connected in series with said second windings, means for impressing an exciting voltage of alternating polarity across the series combination of the second windings and the impedance element to excite the cores, the polarities of the several windings being such that when the magnetic state of the cores have a first predetermined relation both cores experience flux variations in response to each alternance of exciting voltage and induce opposing voltages in said first windings, said polarities of the several windings also being such that when the magnetic states of the cores have a second predetermined relation, only one core experiences a flux variation in response to each alternance of exciting voltage and induces a voltage its first winding of polarity to pass current through said unidirectional conducting device, means to establish said second predetermined relation between the magnetic states of said cores, and feedback means to maintain said second predetermined relation during application of said exciting voltage, said last named means comprising a capacitor circuit means for placing a charge on said capacitor proportional to the voltage drop across said impedance element, and a discharge circuit for said capacitor which includes the first windings on said cores, said discharge circuit being arranged to pass current through said first windings in a direction to drive the cores to magnetic states having said first predetermined relation.

References Cited in the file of this patent

UNITED STATES PATENTS

| | | |
|---|---|---|
| 2,774,956 | Bonn | Dec. 18, 1956 |
| 2,801,344 | Lubkin | July 30, 1957 |
| 2,846,667 | Goodell | Aug. 5, 1958 |
| 2,902,609 | Ostroff | Sept. 1, 1959 |